United States Patent
Nishiura et al.

(10) Patent No.: US 10,505,171 B2
(45) Date of Patent: Dec. 10, 2019

(54) METAL-AIR BATTERY

(71) Applicant: Hitachi Zosen Corporation, Osaka (JP)

(72) Inventors: Sousuke Nishiura, Osaka (JP); Masanobu Aizawa, Osaka (JP); Takehiro Shimizu, Osaka (JP); Kazuya Kameyama, Osaka (JP)

(73) Assignee: HITACHI ZOSEN CORPORATION (JP)

( * ) Notice: Subject to any disclaimer, the term of this patent is extended or adjusted under 35 U.S.C. 154(b) by 0 days.

(21) Appl. No.: 15/557,981

(22) PCT Filed: Feb. 18, 2016

(86) PCT No.: PCT/JP2016/054681
§ 371 (c)(1),
(2) Date: Sep. 13, 2017

(87) PCT Pub. No.: WO2016/152338
PCT Pub. Date: Sep. 29, 2016

(65) Prior Publication Data
US 2018/0047967 A1   Feb. 15, 2018

(30) Foreign Application Priority Data
Mar. 24, 2015 (JP) .................. 2015-061105

(51) Int. Cl.
*H01M 2/20* (2006.01)
*H01M 4/86* (2006.01)
(Continued)

(52) U.S. Cl.
CPC .............. *H01M 2/20* (2013.01); *H01M 2/10* (2013.01); *H01M 2/1005* (2013.01);
(Continued)

(58) Field of Classification Search
None
See application file for complete search history.

(56) References Cited

U.S. PATENT DOCUMENTS

| | | | |
|---|---|---|---|
| 2013/0078535 A1 | 3/2013 | Aizawa | 429/403 |
| 2016/0072114 A1 | 3/2016 | Shimizu et al. | |

FOREIGN PATENT DOCUMENTS

| | | |
|---|---|---|
| JP | 2009-218179 A | 9/2009 |
| JP | 2010-218948 A | 9/2010 |

(Continued)

OTHER PUBLICATIONS

PCT/IB/326 Notification Concerning Transmittal of International Preliminary Report on Patentability including PCT/IB/373 and PCT/ISA/237 (in Japanese) dated Oct. 5, 2017 for International Application No. PCT/JP2016/054681.

(Continued)

*Primary Examiner* — Wyatt P McConnell
(74) *Attorney, Agent, or Firm* — Ostrolenk Faber LLP (57) ABSTRACT

A metal-air battery (1) includes a tubular positive electrode (2) centered on a predetermined central axis (J1), a negative electrode (3) opposing an inner side surface of the positive electrode, and an electrolyte layer (4) disposed between the negative electrode and the positive electrode. The positive electrode includes a positive electrode conductive layer (21), a positive electrode catalyst layer (22), and a positive electrode current collector (24). The positive electrode catalyst layer is formed on the outer side surface of the tubular positive electrode conductive layer centered on the central axis and has lower electrical conductivity than the positive electrode conductive layer. The positive electrode current collector is formed on an area of the outer side surface of the positive electrode conductive layer where the positive electrode catalyst layer does not exist, to be in direct contact with the outer side surface. This structure reduces the electrical (Continued)

resistance between the positive electrode conductive layer and the positive electrode current collector and improves battery performance. Since the thickness in the radial direction of the positive electrode current collector is greater than that of the positive electrode catalyst layer, the positive electrode current collector and a connection terminal can be easily connected to each other.

16 Claims, 4 Drawing Sheets

(51) Int. Cl.
- *H01M 4/90* (2006.01)
- *H01M 12/06* (2006.01)
- *H01M 12/08* (2006.01)
- *H01M 2/10* (2006.01)
- *H01M 2/36* (2006.01)
- *H01M 4/36* (2006.01)
- *H01M 4/38* (2006.01)

(52) U.S. Cl.
CPC ............ *H01M 2/202* (2013.01); *H01M 2/36* (2013.01); *H01M 4/366* (2013.01); *H01M 4/381* (2013.01); *H01M 4/86* (2013.01); *H01M 4/90* (2013.01); *H01M 12/06* (2013.01); *H01M 12/065* (2013.01); *H01M 12/08* (2013.01); *H01M 4/38* (2013.01); *Y02E 60/128* (2013.01)

(56) References Cited

FOREIGN PATENT DOCUMENTS

| | | |
|---|---|---|
| JP | 2014-107063 A | 6/2014 |
| JP | 2014-125367 A | 7/2014 |
| JP | 2014-194892 A | 10/2014 |
| WO | WO 2011/152464 A1 | 12/2011 |
| WO | WO 2014/156763 A1 | 10/2014 |

OTHER PUBLICATIONS

PCT/IB/338 Notification of Transmittal of Translation of the International Preliminary Report on Patentability including PCT/IB/373 and PCT/ISA/237 (in English) dated Oct. 5, 2017 for International Application No. PCT/JP2016/054681.

International Search Report dated May 17, 2016 in corresponding PCT International Application No. PCT/JP2016/054681.

Written Opinion dated May 17, 2016 in corresponding PCT International Application No. PCT/JP2016/054681.

| | LAYER IN CONTACT WITH CURRENT COLLECTOR | PRESENCE OR ABSENCE OF CONDUCTIVE PLATE | ELECTRICAL RESISTANCE | DISCHARGE PERFORMANCE [mA/cm²] |
|---|---|---|---|---|
| EXAMPLE 1 | CONDUCTIVE LAYER | YES | ○ | 57 |
| EXAMPLE 2 | CONDUCTIVE LAYER | NO | ○ | 53 |
| COMPARATIVE EXAMPLE 1 | CATALYST LAYER | YES | × | 30 |
| COMPARATIVE EXAMPLE 2 | CATALYST LAYER | NO | × | 24 |

FIG. 5

METAL-AIR BATTERY

CROSS-REFERENCE TO RELATED APPLICATIONS

The present application is a 35 U.S.C. §§ 371 national phase conversion of PCT/JP2016/054681, filed Feb. 18, 2016, which claims priority to Japanese Patent Application No. 2015-061105, filed Mar. 24, 2015, the contents of both of which are incorporated herein by reference. The PCT International Application was published in the Japanese language.

TECHNICAL FIELD

The present invention relates to a metal-air battery.

BACKGROUND ART

There are conventionally known metal-air batteries that use a metal as an active material for the negative electrode and oxygen from the air as an active material for the positive electrode. For example, Japanese Patent Application Laid-Open No. 2014-194892 (Document 1) and International Publication No. 2014/156763 (Document 2) disclose metal-air batteries in which a negative electrode layer, an electrolyte layer, and a positive electrode layer are concentrically disposed radially outward from a central axis in this order. In the positive electrode layers of these metal-air batteries, a positive electrode catalyst is carried by the outer side surface of a positive electrode conductive layer, forming a positive electrode catalyst layer. In Document 1, a mesh sheet made of a metal such as nickel is wound around the positive electrode catalyst layer, forming a current collector layer. Document 1 also describes a case of providing an interconnector as a current collector layer. In this case, the interconnector abuts on part of the outer side surface of the positive electrode conductive layer that carries the positive electrode catalyst. That is, the interconnector is substantially formed on the positive electrode catalyst layer. In Document 2, an interconnector made of ceramic is provided on part of the outer side surface of the positive electrode catalyst layer, and a liquid repellent layer is further formed to cover the outer side surface of the positive electrode catalyst layer along with the interconnector.

In the metal-air batteries in Documents 1 and 2, since the positive electrode current collector is formed on the positive electrode catalyst layer, the electrical resistance between the positive electrode current collector and the positive electrode conductive layer will increase if the positive electrode catalyst layer has low electrical conductivity. In this case, the battery performance of the metal-air batteries is reduced. There is also demand for the metal-air batteries to easily establish connection between the positive electrode current collector and a connection terminal that is connected to an external circuit or the like.

SUMMARY OF INVENTION

The present invention is intended for a metal-air battery, and it is an object of the present invention to easily establish connection between a positive electrode current collector and a connection terminal and to reduce the electrical resistance between the positive electrode current collector and a positive electrode conductive layer and thereby improve battery performance.

The metal-air battery according to the present invention includes a tubular positive electrode centered on a predetermined central axis, a negative electrode opposing an inner side surface of the positive electrode, and an electrolyte layer disposed between the negative electrode and the positive electrode. The positive electrode includes a tubular positive electrode conductive layer centered on the central axis, a positive electrode catalyst layer formed on an outer side surface of the positive electrode conductive layer and having lower electrical conductivity than the positive electrode conductive layer, and a positive electrode current collector formed on an area of the outer side surface of the positive electrode conductive layer where the positive electrode catalyst layer does not exist, to be in direct contact with the outer side surface. A thickness in a radial direction of the positive electrode current collector is greater than a thickness in the radial direction of the positive electrode catalyst layer.

According to the present invention, it is possible to easily establish connection between the positive electrode current collector and a connection terminal and to reduce the electrical resistance between the positive electrode current collector and the positive electrode conductive layer and thereby improve battery performance.

In a preferred embodiment of the present invention, the positive electrode conductive layer is made of conductive ceramic, and the positive electrode current collector is made of solder that is capable of forming a bond with ceramic.

In another preferred embodiment of the present invention, the positive electrode conductive layer, the positive electrode catalyst layer, and the positive electrode current collector are each made of a perovskite type oxide.

In an aspect of the present invention, the metal-air battery further includes a conductive plate having a plate-like shape that extends at least in an axial direction along the central axis and having higher electrical conductivity than the positive electrode current collector. The positive electrode current collector extends in the axial direction on the outer side surface of the positive electrode conductive layer, and the conductive plate is bonded to approximately a whole in the axial direction of the positive electrode current collector.

In this case, the conductive plate is preferably bonded to a positive electrode current collector of another metal-air battery that has a structure similar to a structure of the metal-air battery.

These and other objects, features, aspects and advantages of the present invention will become more apparent from the following detailed description of the present invention when taken in conjunction with the accompanying drawings.

DESCRIPTION OF EMBODIMENTS

Figure 1:
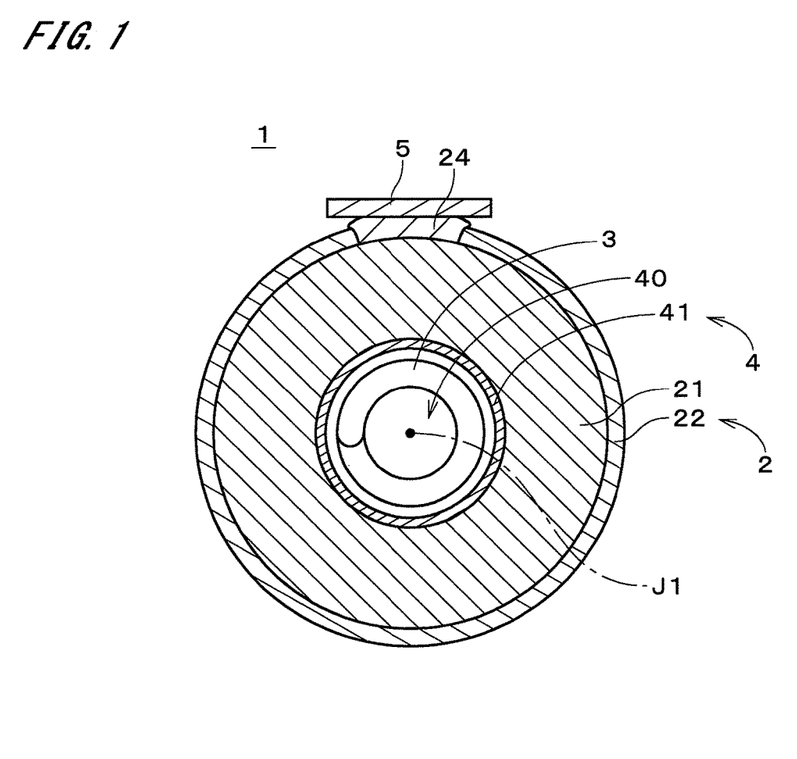
FIG. 1 illustrates a configuration of a metal-air battery.

FIG. 1 illustrates a configuration of a metal-air battery 1 according to an embodiment of the present invention. The metal-air battery 1 in FIG. 1 is a secondary battery using zinc ions, i.e., a zinc-air secondary battery. The metal-air battery 1 may use other metal ions. The metal-air battery 1 has a generally columnar shape centered on a central axis J1, and FIG. 1 illustrates a cross section of the metal-air battery 1 (excluding a negative electrode 3, which will be described later) in a plane perpendicular to the central axis J1. The metal-air battery 1 includes a positive electrode 2, the negative electrode 3, and an electrolyte layer 4.

The negative electrode 3 (also referred to as a "metal electrode") is a coiled member centered on the central axis J1. The negative electrode 3 according to the present embodiment is shaped by winding a linear member having a generally circular cross-sectional shape in a spiral about the central axis J1. The negative electrode 3 includes a coiled base member made of a conductive material, and a deposited metal layer formed on a surface of the base member. The ends of the negative electrode 3 in the direction of the central axis J1 are connected to a negative electrode connection terminal (not shown).

Examples of the material for forming the above base member include metals such as copper (Cu), nickel (Ni), silver (Ag), gold (Au), iron (Fe), aluminum (Al), and magnesium (Mg), and alloys that contain any of these metals. In the present embodiment, the base member is made of copper. From the viewpoint of increasing the electrical conductivity of the base member that serves also as a negative electrode current collector, it is preferable for the base member to contain copper or a copper alloy. When the main body of the base member is made of copper, it is preferable that a protective film made of another metal such as nickel be formed on a surface of the main body. In this case, the surface of the base member is the surface of the protective film. The protective film may have a thickness of 1 to 20 micrometers (μm) and may be formed by plating. The deposited metal layer is formed by electrodeposition of zinc (Zn). Alternatively, the deposited metal layer may be formed by electrodeposition of an alloy that contains zinc. Depending on the design of the metal-air battery 1, the negative electrode 3 may have a tubular or rod-like shape.

A cylindrical separator 41 is provided on the periphery of the negative electrode 3, and the cylindrical positive electrode 2 (also referred to as an "air electrode") is provided on the periphery of the separator 41. The inner side surface of the positive electrode 2 opposes the negative electrode 3 via the separator 41. The negative electrode 3, the separator 41, and the positive electrode 2 are concentrically provided about the central axis J1, and the distance between the outer edge of the negative electrode 3 and the positive electrode 2, when viewed along the central axis J1, is constant along the entire circumference in the circumferential direction about the central axis J1. That is, the interval between equipotential surfaces of the negative electrode 3 and the positive electrode 2 in the metal-air battery 1 is constant along the entire circumference. Since the equipotential surfaces have no unevenness, the current distribution in the circumferential direction is constant during charge and discharge. Note that the positive electrode 2 may have other shapes such as a tubular regular polygonal shape having six or more vertices, as long as the current distribution is approximately uniform along the entire circumference. The details of the separator 41 will be described later.

The positive electrode 2 includes a porous positive electrode conductive layer 21 that is a tubular supporter centered on the central axis J1, and a positive electrode catalyst layer 22 that is formed on the outer side surface of the positive electrode conductive layer 21 on the side opposite to the negative electrode 3. The positive electrode conductive layer 21 and the positive electrode catalyst layer 22 are both made of conductive ceramic. The positive electrode conductive layer 21 has higher electrical conductivity than the positive electrode catalyst layer 22. The outer side surface of the positive electrode conductive layer 21 includes an area of absence of the positive electrode catalyst layer 22. In this area of absence, a positive electrode current collector 24 is provided. The positive electrode current collector 24 is an interconnector that is made of conductive ceramic having alkali resistance and is in direct contact with part of the outer side surface of the positive electrode conductive layer 21. The positive electrode current collector 24 has higher electrical conductivity than the positive electrode catalyst layer 22. The positive electrode current collector 24 extends in the axial direction along the central axis J1 on the outer side surface of the positive electrode conductive layer 21. Preferably, the positive electrode current collector 24 extends along approximately the entire length in the axial direction of the metal-air battery 1. Depending on the design of the metal-air battery 1, the positive electrode current collector 24 may be short in the axial direction.

A conductive plate 5 is provided on the surface of the positive electrode current collector 24 on the side opposite to the positive electrode conductive layer 21 (i.e., the surface facing radially outward about the central axis J1). The conductive plate 5 is a plate-like metal member that extends in the axial direction and has higher electrical conductivity than the positive electrode current collector 24. Preferably, the conductive plate 5 is made of copper. The thickness of the conductive plate 5 is, for example, greater than or equal to 0.1 millimeters (mm) and less than or equal to 2.0 mm. Preferably, the thickness of the conductive plate 5 is greater than or equal to 0.5 mm and less than or equal to 1.0 mm. The conductive plate 5 is bonded to approximately the whole in the axial direction of the positive electrode current collector 24 with, for example, thermosetting metal paste (i.e., silver paste). The conductive plate 5 may be regarded as a positive electrode connection terminal that is electrically connected to the positive electrode current collector 24.

The positive electrode catalyst layer 22 is formed on an area of the outer side surface of the positive electrode conductive layer 21 that is not covered with the positive electrode current collector 24. The entire outer side surface of the positive electrode conductive layer 21 is covered with the positive electrode catalyst layer 22 and the positive electrode current collector 24. A porous layer made of a material having liquid repellency (e.g., tetrafluoroethylene-hexafluoropropylene copolymer (FEP) or polytetrafluoroethylene (PTFE)) is formed on the outer side surface of the positive electrode catalyst layer 22. In actuality, this material is dispersed in the vicinity of the outer side surface of the positive electrode catalyst layer 22 and is thus not formed as a definite film. A portion of the positive electrode catalyst layer 22 in the vicinity of the outer side surface may be regarded as a liquid repellent layer. This portion has high gas permeability and high liquid impermeability.

The positive electrode conductive layer 21 serving as a supporter is formed by extrusion molding and firing of a material that contains conductive ceramic. Preferable examples of the conductive ceramic include perovskite type oxides and spinel type oxides, both having conductivity. In the present embodiment, the positive electrode conductive layer 21 is made of a perovskite type oxide (e.g., $LaSrMnO_3$ (LSM), $LaSrMnFeO_3$ (LSMF), or $LaSrCoFeO_3$ (LSCF)). It is preferable for the perovskite type oxide used for the positive electrode conductive layer 21 to contain at least one of Co, Mn, and Fe. From the viewpoint of preventing degradation due to oxidation during charge, it is preferable for the positive electrode conductive layer 21 to contain no conductive carbon. Depending on the design of the metal-air battery 1, the positive electrode conductive layer 21 may be made of a conductive material other than conductive ceramic (the same applies to the positive electrode current collector 24).

The positive electrode catalyst layer 22 includes a portion where conductive ceramic powder such as a perovskite type oxide (e.g., LSMF) is carried on the positive electrode conductive layer 21 by, for example, a slurry coating method and firing. The positive electrode catalyst layer 22 is a porous film that is made of ceramic and formed on the outer side surface of the positive electrode conductive layer 21 on the side opposite to the negative electrode 3, and is supported by the positive electrode conductive layer 21 that is a supporter. The thickness of the positive electrode catalyst layer 22 is smaller enough than that of the positive electrode conductive layer 21. In the metal-air battery 1, the porous positive electrode catalyst layer 22 has, in principle, an interface between air and an electrolyte solution 40, which will be described later. The positive electrode catalyst layer 22 may be made of other catalysts such as manganese dioxide.

The positive electrode current collector 24 includes a portion where conductive ceramic powder is carried on the positive electrode conductive layer 21 by, for example, a slurry coating method and firing. Preferable examples of the conductive ceramic include perovskite type oxides and spinel type oxides, both having conductivity. The average particle diameter of the powder used to form the positive electrode current collector 24 is preferably smaller than that of the powder used to form the positive electrode conductive layer 21 and the positive electrode catalyst layer 22, and may be 1 μm or less, for example. Thus, the positive electrode current collector 24 is densely formed. The thickness in the radial direction of the positive electrode current collector 24 is greater than that of the positive electrode catalyst layer 22. That is, the positive electrode current collector 24 protrudes radially outward from the surrounding area of the outer side surface of the metal-air battery 1. This configuration increases the cross-sectional area of the positive electrode current collector 24 that is perpendicular to the axial direction, and accordingly reduces the electrical resistance between both ends of the positive electrode current collector 24 in the axial direction. Alternatively, the positive electrode current collector 24 may be provided at a plurality of positions in the circumferential direction.

The separator 41 already described is a porous film that is formed on the inner side surface of the positive electrode conductive layer 21 on the same side as the negative electrode 3, and is formed along the entire circumference on this inner side surface. The separator 41 may be a sintered compact of ceramic powder having high mechanical strength and high insulating properties, such as silica ($SiO_2$), alumina ($Al_2O_3$), zirconia ($ZrO_2$), titania ($TiO_2$), hafnia ($HfO_2$), or ceria ($CeO_2$), and may have alkali resistance. As will be described later, the preparation of the separator 41 involves depositing slurry that contains the aforementioned ceramic powder and a binder on the inner side surface of the positive electrode conductive layer 21 by, for example, a slurry coating method, drying the slurry, and removing the binder contained in the slurry by firing at a high temperature. The removal of the binder prevents the lifetime of the separator from being reduced due to degradation of the binder. The separator 41 is preferably made of only ceramic. Alternatively, the separator 41 may be a mixture or laminated body of the aforementioned ceramic. The presence of the separator 41 prevents or suppresses the occurrence of a situation where deposited metal (e.g., dendrites) on the negative electrode 3 reaches the positive electrode 2 during charge, which will be described later.

The inner space of the tubular positive electrode 2 (on the same side as the central axis J1) is filled with the aqueous electrolytic solution 40. The electrolytic solution 40 exists between and in contact with the positive electrode 2 and the negative electrode 3. The negative electrode 3 is immersed in almost its entirety in the electrolytic solution 40. The porous separator 41 and the pores in the positive electrode conductive layer 21 are also filled with the electrolytic solution 40. Some pores in the positive electrode catalyst layer 22 are also filled with the electrolytic solution 40. In the following description, the space between the negative electrode 3 and the positive electrode 2, when viewed along the central axis J1, is referred to as the "electrolyte layer 4." That is, the electrolyte layer 4 is disposed between the negative electrode 3 and the positive electrode 2. In the present embodiment, the electrolyte layer 4 includes the separator 41.

The electrolyte solution 40 is an aqueous alkaline solution, and preferably contains an aqueous potassium hydroxide (caustic potash, KOH) solution or an aqueous sodium hydroxide (caustic soda, NaOH) solution. The electrolyte solution 40 also contains zinc ions or ions containing zinc. That is, zinc ions contained in the electrolyte solution 40 may be in various forms and may be regarded as ions containing zinc (i.e., zinc atoms). For example, zinc ions may exist as tetrahydroxy zinc ions.

The opposite end surfaces of the negative electrode 3, the electrolyte layer 4, and the positive electrode 2 in the direction of the central axis J1 are fixed to disc-like closure members. Each closure member has a through hole in the center. In the metal-air battery 1, the positive electrode current collector 24, the liquid repellent layer (portion of the positive electrode catalyst layer 22 in the vicinity of the outer side surface), and the closure members prevent the electrolyte solution 40 inside the metal-air battery 1 from leaking out from portions other than the aforementioned through holes to the outside. The electrolyte solution may also be circulated between the metal-air battery 1 and a reservoir tank (not shown) by using the through holes of the closure members on the opposite end surfaces.

During discharge in the metal-air battery 1 in FIG. 1, the negative electrode connection terminal and the positive electrode connection terminal (conductive plate 5) are, for example, electrically connected to each other via a load such as lighting equipment. Zinc contained in the negative electrode 3 is oxidized into zinc ions, and electrons therein are supplied to the positive electrode 2 via the negative electrode connection terminal and the positive electrode connection terminal. In the porous positive electrode 2, oxygen from the air, which has passed through the liquid-repellent layer, is reduced by the electrons supplied from the negative electrode 3 and dissolved as hydroxide ions in the electrolyte solution. In the positive electrode 2, the positive electrode catalyst accelerates oxygen reduction reactions.

During charge in the metal-air battery 1, on the other hand, a voltage is applied between the negative electrode connection terminal and the positive electrode connection terminal, so that electrons are supplied from hydroxide ions to the positive electrode 2 and oxygen is generated. In the negative electrode 3, metal ions are reduced by the electrons supplied to the negative electrode connection terminal via the positive electrode connection terminal, and zinc is deposited.

At this time, electric field concentrations are less likely to occur because the coiled negative electrode 3 has no corners.

That is, there occurs no large imbalance in current density. In addition, the negative electrode 3 is in uniform contact with the electrolyte solution 40. As a result, the generation and growth of zinc dendrites deposited in dendritic form and zinc whiskers deposited in whisker form (needle-like form) are considerably suppressed. In actuality, close-grained zinc is uniformly deposited on almost the entire surface of the negative electrode 3, and a deposited metal layer is formed thereon. In the positive electrode 2, the positive electrode catalyst contained in the positive electrode catalyst layer 22 accelerates oxygen generation. Moreover, the positive electrode 2 does not suffer from oxidation degradation caused by oxygen generated during charge, because no carbon material is used for the positive electrode 2.

In the metal-air battery 1, the positive electrode 2 and the separator 41 are prepared as an integral member. In the preparation of the positive electrode 2, first, a tubular molded object is formed by extrusion molding of a mixture that contains, for example, conductive ceramic powder, an organic binder, and an organic solvent. For example, a perovskite type oxide is used as conductive ceramic. The molded object is then subjected to firing so as to form the tubular positive electrode conductive layer 21 as a porous supporter.

Before the firing, the molded object may be subjected to heat treatment at a temperature of 100 to 800° C. to decompose and remove organic components in the molded object. The firing can be conducted in any condition as long as the molded object is sintered sufficiently and capable of having good properties such as gas permeability, electrolyte permeability, and battery performance, and the firing is preferably conducted at a temperature of 1100 to 1500° C. Alternatively, the molded object may be co-fired with other layers described below. The co-firing helps improve the adhesive strength between the molded object and the other layers. The co-firing also helps reduce the lead time of the firing step, as compared with the case where each layer is fired individually. The positive electrode conductive layer 21 may be formed by techniques other than extrusion molding and firing.

When the positive electrode conductive layer 21 has been prepared, an area of the outer side surface of the positive electrode conductive layer 21 (where the positive electrode current collector 24 is to be formed, and this area is hereinafter referred to as a "current collecting area") is masked. Then, slurry that contains, for example, positive electrode catalyst powder, an organic binder, and an organic solvent is deposited on the outer side surface of the positive electrode conductive layer 21 by a slurry coating method, and then this slurry film is fired to form the positive electrode catalyst layer 22. For example, ceramic such as a perovskite type oxide is used as the positive electrode catalyst. The current collecting area is an area of absence of the positive electrode catalyst.

The formation (deposition) of the slurry film may use various techniques such as casting, dipping, spraying, and printing. The film thickness of each layer of the positive electrode 2 is appropriately adjusted in consideration of firing shrinkage during firing and from the viewpoint of securing properties relating to battery performance, such as gas permeability and electrolyte permeability. The positive electrode catalyst layer 22 may be formed by techniques other than deposition and firing described above (the same applies to the positive electrode current collector 24 and the separator 41).

When the positive electrode catalyst layer 22 has been formed, the outer side surface of the positive electrode catalyst layer 22 is masked. In other words, the area of the outer side surface of the positive electrode conductive layer 21, excluding the current collecting area, is substantially masked. Then, slurry that contains fine powder such as a perovskite type oxide is used to form a film on the current collecting area, and this film is fired to form the positive electrode current collector 24. The positive electrode current collector 24 is in direct contact with the current collecting area of the outer side surface of the positive electrode conductive layer 21 that extends in plane form, and is not via the positive electrode catalyst layer 22. Note that the positive electrode catalyst layer 22 and the positive electrode current collector 24 may be formed by co-firing (the same applies to the other layers formed by firing). Alternatively, in the formation of the positive electrode catalyst layer 22, the positive electrode catalyst layer 22 may be formed on the entire outer side surface of the positive electrode conductive layer 21 without using masking. In this case, the positive electrode current collector 24 is formed on the current collecting area by removing part of the positive electrode catalyst layer 22 that adheres to the current collecting area by polishing or other techniques.

Although the positive electrode current collector 24 has a close-grained structure, voids are generated therein at a fixed ratio. However, since the thickness in the radial direction of the positive electrode current collector 24 is greater than that of the positive electrode catalyst layer 22, the coupling of voids between the surfaces in the radial direction of the positive electrode current collector 24 is suppressed or prevented. This suppresses or prevents leakage of the electrolytic solution 40 from the positive electrode current collector 24. Even if the thickness of the positive electrode current collector 24 varies to some extent, a fixed bonding area is ensured between the positive electrode catalyst layer 22 and the positive electrode current collector 24 that is thicker than the positive electrode catalyst layer 22, and therefore no reduction in adhesion occurs between the positive electrode catalyst layer 22 and the positive electrode current collector 24. In other words, the leakage of the electrolytic solution 40 from the interface between the positive electrode current collector 24 and the positive electrode catalyst layer 22 is suppressed or prevented.

On the inner side surface of the positive electrode conductive layer 21, slurry that contains a material for forming a separator is deposited by a slurry coating method and fired to form the separator 41. For example, ceramic having insulating properties is used as the material for forming a separator. From the viewpoint of reducing the manufacturing cost of the metal-air battery 1, it is preferable that alumina is used as the material for forming a separator. From the viewpoint of ensuring the strength and stability of the separator 41, it is preferable that zirconia is used as the material for forming a separator.

When the separator 41 is made of a material such as alumina or zirconia and the positive electrode conductive layer 21 is made of LSC ($LaSrCoO_3$) or LSCF, a case is conceivable in which a reaction phase is formed between the separator 41 and the positive electrode conductive layer 21 and causes problems such as a reduction in the electrical conductivity of the positive electrode conductive layer 21 and clogging of the pores. In this case, it is preferable that an anti-reaction layer that contains, for example, ceria be formed between the separator 41 and the positive electrode conductive layer 21. Meanwhile, when there is a large difference in the coefficient of linear expansion between the separator 41 and the positive electrode conductive layer 21, cracks may occur during firing. In this case, it is preferable that a layer for reducing the difference in the coefficient of linear expansion be formed between the separator 41 and the positive electrode conductive layer 21.

When the positive electrode catalyst layer 22, the positive electrode current collector 24, and the separator 41 have been formed on the positive electrode conductive layer 21, slurry that contains a liquid repellent material is applied to the outer side surface of the positive electrode catalyst layer 22 and then fired, so that a portion of the positive electrode catalyst layer 22 that is in the vicinity of the outer side surface becomes a liquid repellent layer. In the application of the slurry containing a liquid repellent material, it is preferable that the area corresponding to the positive electrode current collector 24 be masked. For example, FEP or PTFE is used as the liquid repellent material. The depth of impregnation of the slurry in the depth direction of the positive electrode catalyst layer 22 is adjusted by adding a necessary amount of a thickener to the slurry to adjust the viscosity of the slurry. This adjustment allows three-phase interfaces to be formed in the positive electrode catalyst layer 22 while preventing the surfaces of particles in the pores of the positive electrode catalyst layer 22 from being completely covered with the liquid repellent material. Through the processing described above, the positive electrode 2 including the separator 41 is prepared.

Here, a metal-air battery according to a comparative example is assumed in which a current collector is formed on a positive electrode catalyst layer. In the metal-air battery according to the comparative example, the positive electrode current collector is indirectly in contact with the positive electrode conductive layer via the positive electrode catalyst layer having lower electrical conductivity than the positive electrode conductive layer. This configuration increases the electrical resistance between the positive electrode conductive layer and the positive electrode current collector and reduces the battery performance of the metal-air battery.

In contrast, in the positive electrode 2 of the metal-air battery 1 in FIG. 1, the positive electrode current collector 24 is formed on the area of the outer side surface of the positive electrode conductive layer 21 where the positive electrode catalyst layer 22 does not exist, so as to be in direct contact with the outer side surface. This configuration reduces losses in electron conduction (reduces electrical resistance) between the positive electrode conductive layer 21 and the positive electrode current collector 24 and improves battery performance.

Besides, since the thickness in the radial direction of the positive electrode current collector 24 is greater than that of the positive electrode catalyst layer 22, the connection between the positive electrode current collector 24 and a connection terminal can be easily established. The positive electrode current collector 24 also has a larger cross-sectional area perpendicular to the axial direction, which reduces the electrical resistance of the positive electrode current collector 24 and thereby further improves battery performance.

In a preferable example of the metal-air battery 1, the positive electrode current collector 24 is formed on the area of absence of the positive electrode catalyst layer 22 after the positive electrode catalyst layer 22 is formed on the outer side surface of the positive electrode conductive layer 21. This produces a shape in which part of the positive electrode current collector 24 is slightly overlaid on the upper surface (surface on the side opposite to the positive electrode conductive layer 21) of the positive electrode catalyst layer 22 in the vicinity of the edge. With this shape, it is possible to more reliability prevent the leakage of the electrolytic solution from the interface between the positive electrode catalyst layer 22 and the positive electrode current collector 24. It is also possible to increase the area of the radially outer surface of the positive electrode current collector 24, thus making it easier to establish connection between the positive electrode current collector 24 and the connection terminal. In the metal-air battery 1 in which the positive electrode 2 is disposed on the outer peripheral side, the area of the surface that can be used to take the air into the battery is larger than that in the case where the positive electrode is disposed on the inner peripheral side. Thus, even if the positive electrode current collector 24 is formed in a relatively large size, the battery performance is not affected. Depending on the design of the metal-air battery 1, the positive electrode catalyst layer 22 may be formed after the positive electrode current collector 24 is formed on the outer side surface of the positive electrode conductive layer 21.

In a preferable example of the metal-air battery 1, the positive electrode conductive layer 21, the positive electrode catalyst layer 22, and the positive electrode current collector 24 are each made of a perovskite type oxide. In this way, when the members that are in contact with one another have the same crystal structure, it is possible to reduce the difference in the coefficient of thermal expansion among the members and to suppress the generation of cracks and delamination due to firing.

In the metal-air battery 1, the positive electrode current collector 24 extends in the axial direction on the outer side surface of the positive electrode conductive layer 21, and the conductive plate 5 that also extends in the axial direction is bonded to approximately the whole in the axial direction of the positive electrode current collector 24. Thus, even if the positive electrode current collector 24 is made of conductive ceramic having lower electrical conductivity than metals or other materials, the presence of the conductive plate 5 can reduce losses in electron conduction in the axial direction. As a result, the battery performance of the metal-air battery 1 is further improved.

The metal-air battery 1 using the positive electrode conductive layer 21 as a supporter can considerably reduce the thickness of the separator 41, as compared with the case where the separator 41 is used as a supporter. It is thus possible to reduce the distance between the negative electrode 3 and the positive electrode 2 and thereby to further improve the battery performance of the metal-air battery 1. In a preferable example of the metal-air battery 1, the thickness of the positive electrode conductive layer 21 is greater than that of the separator 41. The thickness of the positive electrode conductive layer 21 in the metal-air battery 1 is preferably greater than three times the thickness of the separator 41, and more preferably, greater than five times the thickness of the separator 41.

While the positive electrode current collector 24 is made of conductive ceramic in the above-described example, the positive electrode current collector 24 may be made of other materials. In another preferable example, the positive electrode current collector 24 is made of solder capable of forming a bond with ceramic. Such solder is also called "special solder for ceramic," and for example, Cerasolzer (registered trademark) manufactured by KURODA TECHNO Co., Ltd. may be used as the aforementioned solder. The solder contains a metal that is coupled to an oxide. The positive electrode current collector 24 made of the aforementioned solder has higher electrical conductivity than the positive electrode catalyst layer 22.

In this way, even in the case where the solder capable of forming a bond with ceramic is used as the material for the positive electrode current collector 24, the performance of the metal-air battery 1 can be improved by forming the positive electrode current collector 24 on the area of the outer side surface of the positive electrode conductive layer 21 where the positive electrode catalyst layer 22 does not exist. In this metal-air battery 1, the positive electrode current collector 24 can be bonded to a connection terminal such as the conductive plate 5 without using other materials such as a silver paste. As a result, it is possible to easily establish connection between the metal-air battery 1 and an external circuit. In addition, the firing step becomes unnecessary in the formation of the positive electrode current collector 24, which reduces the amount of time required to manufacture the metal-air battery 1.

Figure 2:
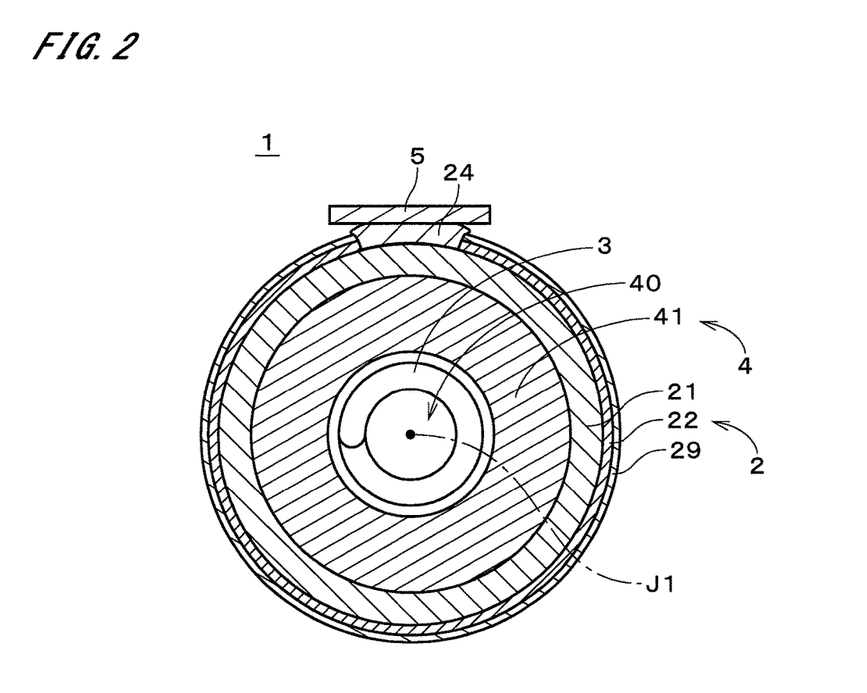
FIG. 2 illustrates another example of the metal-air battery.

While the positive electrode conductive layer 21 serves as a supporter in the metal-air battery 1 illustrated in FIG. 1, other constituent elements may serve as a supporter. FIG. 2 illustrates another example of the metal-air battery 1. The metal-air battery 1 in FIG. 2 differs from the metal-air battery 1 in FIG. 1 in that the separator 41 serves as a supporter. The other configuration is the same as that of the metal-air battery 1 in FIG. 1, and the same constituent elements are given the same reference numerals.

The separator 41 that serves as a supporter in the metal-air battery 1 in FIG. 2 is a porous sintered compact of ceramic. Examples of the ceramic include alumina and zirconia. A positive electrode 2 is formed on the outer side surface of the separator 41 that is part of an electrolyte layer 4. More specifically, a positive electrode conductive layer 21 that serves for electron conduction is circumferentially formed on the outer side surface of the separator 41. A positive electrode catalyst layer 22 that serves for catalyst reactions is formed on the outer side surface of the positive electrode conductive layer 21. The positive electrode conductive layer 21 and the positive electrode catalyst layer 22 are formed by, for example, depositing and firing predetermined slurry. Examples of the deposition technique include doctor blading, rolling, and pressing.

Moreover, a positive electrode current collector 24 made of conductive ceramic is provided on part of the outer side surface of the positive electrode conductive layer 21. The positive electrode current collector 24 is an interconnector that is in direct contact with an area (current collecting area) of the outer side surface of the positive electrode conductive layer 21 where the positive electrode catalyst layer 22 does not exist. The positive electrode current collector 24 extends in the axial direction along the central axis J1 on the outer side surface of the positive electrode conductive layer 21. The positive electrode catalyst layer 22 already described covers the entire area of the outer side surface of the positive electrode conductive layer 21, excluding the current collecting area. In the metal-air battery 1 illustrated in FIG. 2, a liquid repellent layer 29 is formed on the outer side surface of the positive electrode catalyst layer 22. The liquid repellent layer 29 is formed by, for example, depositing and firing predetermined slurry. The liquid repellent layer 29 may include a portion of the positive electrode catalyst layer 22 that is in the vicinity of the outer side surface. That is, the boundary between the liquid repellent layer 29 and the positive electrode catalyst layer 22 does not necessarily have to be defined clearly. A conductive plate 5 is provided on the surface of the positive electrode current collector 24 on the side opposite to the positive electrode conductive layer 21.

With the metal-air battery 1 in FIG. 2 in which the separator 41 serves as a supporter, the positive electrode current collector 24 is in direct contact with part of the outer side surface of the positive electrode conductive layer 21. Thus, it is possible to reduce the electrical resistance between the positive electrode conductive layer 21 and the positive electrode current collector 24 and thereby to improve the battery performance of the metal-air battery 1. Besides, since the thickness in the radial direction of the positive electrode current collector 24 is greater than that of a laminated body of the positive electrode catalyst layer 22 and the liquid repellent layer 29, it is possible to easily establish electrical connection between the positive electrode current collector 24 and a connection terminal.

Figure 3:
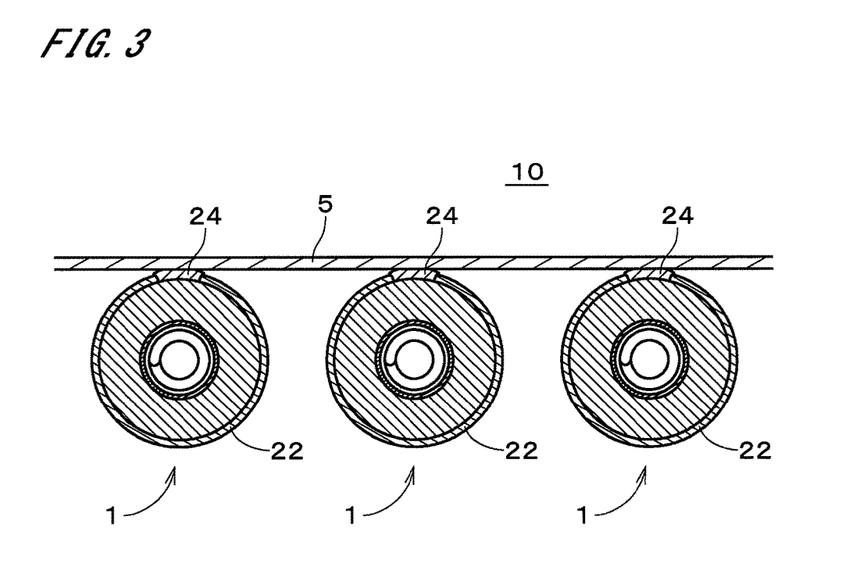
FIG. 3 illustrates a battery unit.

FIG. 3 illustrates a battery unit 10 obtained by connecting a plurality of metal-air batteries 1. In the battery unit 10 in FIG. 3, the positive electrode current collectors 24 of the metal-air batteries 1 having the same structure are bonded to a conductive plate 5 that extends in the axial direction and in a direction perpendicular to the axial direction. In each metal-air battery 1, the thickness in the radial direction of the positive electrode current collector 24 is greater than that of the positive electrode catalyst layer 22. Thus, it is possible to easily establish connection between the positive electrode current collectors 24 and the conductive plate 5, which is a connection terminal. As a result, it is possible to easily achieve the battery unit 10 using the plurality of metal-air batteries 1. While the metal-air batteries 1 used in FIG. 3 are the same as the metal-air battery 1 in FIG. 1, it is of course possible to use a plurality of metal-air batteries 1 that are the same as the metal-air battery 1 in FIG. 2.

EXAMPLE 1

Preparation of Porous Tube

First, $LaSrMnO_3$ (LSM) powder (manufactured by KCM Corporation Co., Ltd.) was pulverized into coarse particles by a cutter mill and then into small particles by a jet mill (manufactured by Nisshin Engineering INC.), and then classified by Turbo Classifier (manufactured by Nisshin Engineering INC.) to obtain LSM powder having an average particle diameter of 30 µm. Part of the powder was pulverized into fine particles by a $ZrO_2$ ball to obtain LSM powder having an average particle diameter of 0.5 µm. Then, 100 parts by mass of the powder having an average particle diameter of 30 µm, 5 parts by mass of the powder having an average particle diameter of 0.5 µm, 12 parts by mass of ion-exchanged water, 12 parts by mass of a binder (manufactured by YUKEN Industry Co., Ltd.), and 4 parts by mass of glycerin were weighed and combined into a mixture, and the mixture was subjected to extrusion molding to obtain a cylindrical tube having an outer diameter of 17.0 mm and an inner diameter of 12.8 mm. This cylindrical tube was fired at 1450° C. for five hours in an ambient atmosphere and then cut to a length of 70 mm. In this way, a porous cylindrical tube was obtained, which was to be a conductive layer serving also as a supporter.

Preparation of Slurry for Catalyst Layer

First, $LaSrMnFeO_3$ (LSMF) powder (manufactured by KCM Corporation Co., Ltd.) was pulverized into coarse particles by a cutter mill and then into small particles by a jet mill, and then classified by Turbo Classifier to obtain LSMF powder having an average particle diameter of 4.0 µm. Also, 75 parts by mass of SOLMIX (registered trademark) H-37 (manufactured by Japan Alcohol Trading Co., Ltd.), 25 parts by mass of 2-(2-n-butoxyethoxy)ethyl acetate (manufactured by Kanto Chemical Co., INC.), and 5 parts by mass of ethyl cellulose (manufactured by Tokyo Chemical Industry Co., Ltd.) were weighed, combined, and stirred for one hour. Then, 65 parts by mass of the previously obtained LSMF powder was weighed, put in a pot mill with a resin ball having a diameter of 10 mm and the stirred mixture, and mixed for 50 hours using a ball mill. In this way, slurry for the catalyst layer was obtained.

Formation of Catalyst Layer

Two areas, each having a width of 5 mm and a length of 60 nm, were set on the outer side surface of the aforementioned porous tube so as to be spaced from each other at an interval of 180 degrees in the circumferential direction, and were covered with a masking tape. These two areas were areas (current collecting areas) where the current collectors were to be formed. The slurry for the catalyst layer was injected into a graduated cylinder, and the porous tube was inserted (dipped) into the graduated cylinder and held for one minute while the upper and lower openings of the porous tube were sealed with silicon rubber. The porous tube was then air-dried for 30 minutes and dried at 80° C. for one and a half hours, which was repeated three times. Thereafter, the porous tube was fired at 1150° C. for five hours in an ambient atmosphere. In this way, the porous tube with the catalyst layer formed on the outer surface was obtained.

Preparation of Slurry for Separator

First, 75 parts by mass of SOLMIX H-37, 25 parts by mass of 2-(2-n-butoxyethoxy)ethyl acetate, and 3.4 parts by mass of ethyl cellulose were weighed, combined, and stirred for one hour. Then, 32 parts by mass of alumina (e.g., A-43-M manufactured by SHOWA DENKO K.K.) was weighed, put in a pot mill with a resin ball having a diameter of 10 mm and the stirred mixture, and mixed for 50 hours using a ball mill. In this way, slurry for the separator was obtained.

Formation of Separator

A hose-like cap (which plays a role of a funnel) was placed in the upper opening of the aforementioned porous tube, and a sealing stopper was placed in the lower opening. The hose-like cap in the upper opening was used to prevent the overflow of slurry. By using the funnel, the slurry for the separator was injected from the upper opening into the porous tube covered with the hose-like cap. The porous tube was held for one minute while being filled up with the slurry. Thereafter, the sealing stopper in the lower opening was removed to discharge the slurry. The porous tube was dried at ambient temperature for 15 hours or more and then dried at 50° C. for two hours or more. The porous tube was then placed upside down, and the aforementioned operations were repeated once again. Thereafter, the porous tube was fired at 1150° C. for four hours to form a separator on the inner side surface of the porous tube.

Preparation of Slurry for Current Collector

First, $LaSrCoFeO_3$ (LSCF) powder (manufactured by KCM Corporation Co., Ltd.) were pulverized into coarse particles by a cutter mill and then into fine particles by a jet mill, and then classified by Turbo Classifier to obtain LSCF powder having an average particle diameter of 0.4 μm. Meanwhile, 75 parts by mass of SOLMIX H-37, 25 parts by mass of 2-(2-n-butoxyethoxy)ethyl acetate, and 5 parts by mass of ethyl cellulose were weighed, combined, and stirred for one hour. Then, 40 parts by mass of the previously obtained LSCF powder were weighed, put in a pot mill with a resin ball having a diameter of 10 mm and the stirred mixture, and mixed for 50 hours using a ball mill. In this way, slurry for the current collector was obtained.

Formation of Current Collector

The area of the outer surface of the aforementioned porous tube, excluding the current collecting areas already set at the time of forming the catalyst layer, was masked. The slurry for the current collector was injected into a graduated cylinder, and the porous tube was inserted (dipped) into the graduated cylinder and held for one minute while the upper and lower openings of the porous tube were sealed with silicon rubber. The porous tube was then air-dried for 30 minutes and dried at 80° C. for one and a half hours, which was repeated five times. Thereafter, the porous tube was fired at 1150° C. for four hours in an ambient atmosphere. In this way, current collectors were formed on the current collecting areas of the porous tube.

Preparation of Dispersion for Liquid Repellent Layer

First, undiluted FEP dispersion (manufactured by Du Pont-Mitsui Fluorochemicals Co., Ltd.) was diluted to 20 parts by mass, and 2.5 parts by weight of ALKOX (registered trademark) E-30 (manufactured by MEISEI Corporation), which served as a thickener, were weighed and added little by little to the diluted FEP solution while stirring the solution in order not to form a cluster of the thickener.

Formation of Liquid Repellent Layer

Portions of the porous tube that corresponded to the current collectors were covered with tapes so that portions of the liquid repellent layer (water-repellent layer) that were to overlap with the current collectors had a width of 1 mm, and the porous tube was immersed in the aforementioned dispersion for one minute. The porous tube was then dried at ambient temperature for 30 minutes and at 60° C. for 15 hours, and further fired at 280° C. for 50 minutes in an ambient atmosphere. In this way, the porous tube with the liquid repellent layer formed in the portion of the catalyst layer in the vicinity of the outer side surface was obtained.

Forming Bond with Conductive Plate

A copper plate having a width of 5 mm, a length of 60 mm, and a thickness of 1 mm was prepared as a conductive plate. A thermosetting silver paste (manufactured by Mitsuboshi Belting Ltd.) was applied to the current collector, and the conductive plate was placed on the paste. It was then fired at 160° C. for one hour in an ambient atmosphere. This produced a sample of the positive electrode in which the separator, the catalyst layer (including the liquid repellent layer), the current collectors, and the conductive plates are provided on the porous tube. In the sample of Example 1, the current collectors were in direct contact with the outer side surface of the porous tube and bonded to the conductive plates.

EXAMPLE 2

The same operations as in Example 1 were carried out, except that the formation of a bond with the conductive plate was omitted, to obtain a sample of the positive electrode in which the separator, the catalyst layer (including the liquid repellent layer), and the current collectors were provided on the porous tube. In the sample of Example 2, the current collectors were in direct contact with the outer side surface of the porous tube.

COMPARATIVE EXAMPLE 1

The same operations as in Example 1 were carried out, except that the masking at the time of forming the catalyst layer was omitted, to obtain a sample of the positive electrode in which the separator, the catalyst layer (including the liquid repellent layer), the current collectors and the conductive plates were provided on the porous tube. In the sample of Comparative Example 1, the current collectors were indirectly in contact with the outer side surface of the porous tube via the catalyst layer, and the current collector were bonded to the conductive plates.

COMPARATIVE EXAMPLE 2

The same operations as in Example 1 were carried out, except that the masking at the time of forming the catalyst layer and the formation of bonds with the conductive plates were omitted, to obtain a sample of the positive electrode in which the separator, the catalyst layer (including the liquid repellent layer), and the current collectors were provided on the porous tube. In the sample of Comparative Example 2, the current collectors were indirectly in contact with the outer side surface of the porous tube via the catalyst layer.

Sample Evaluation

Figure 4:
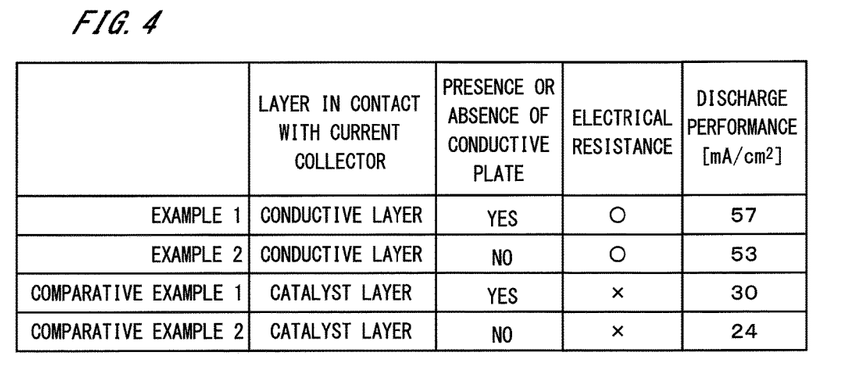
FIG. 4 illustrates the results of evaluating samples.
Figure 5:
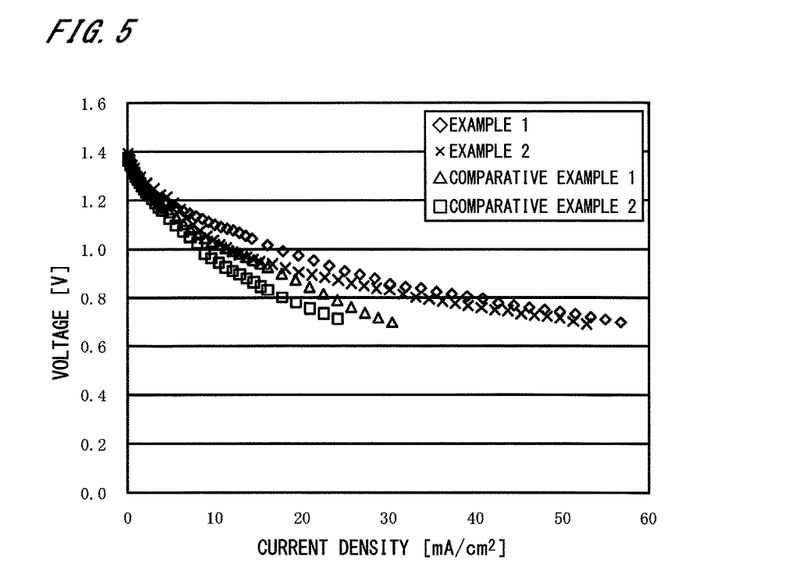
FIG. 5 illustrates the discharge characteristics of the metal-air battery.

FIGS. 4 and 5 illustrate the results of evaluating the samples of the positive electrode according to Example 1, Example 2, Comparative Example 1, and Comparative Example 2. Here, a measurement of the electrical resistance and an evaluation of the battery performance were performed on each sample. In the measurement of the electrical resistance, the electrical resistance between the two current collectors formed at an interval of 180 degrees in the circumferential direction was measured using a tester. In the "Electrical Resistance" field in FIG. 4, an open circle indicates that the measured value of the electrical resistance is 1 Ω or less, and a cross indicates that the measured value is 5 Ω or more. FIG. 5 shows the discharge characteristics of the metal-air batteries, obtained by the evaluation of the battery performance. In the evaluation of the battery performance, a Cu coil having 2 grams of zinc electrodeposited thereon was inserted as a negative electrode inside each sample of the positive electrode, and an electrolyte solution (which contains 7 molar (M) KOH and 0.65 M zinc oxide (ZnO)) was circulated inside the sample, so as to measure the discharge characteristics of the battery at ambient temperature.

As illustrated in FIG. 4, the samples according to Comparative Examples 1 and 2, in which the current collectors are indirectly connected to the porous tube via the catalyst layer, show an electrical resistance of 5 Ω or more. On the other hand, the samples according to Examples 1 and 2, in which the current collectors are directly connected to the porous tube, achieve an electrical resistance of 1 Ω or less. Moreover, as illustrated in FIG. 5, the samples according to Examples 1 and 2 show a gentle voltage drop with an increase in current density, as compared with the samples according to Comparative Examples 1 and 2. Thus, it can be said that the discharge performance of the batteries has improved. In particular, the sample according to Example 1, in which the current collectors are bonded to the conductive plates, shows the most favorable discharge performance. In FIG. 4, the current density at a voltage of 0.7V is shown in the "Discharge Performance" field.

The above-described metal-air battery 1 may be modified in various ways.

The conductive plate 5 in the metal-air batteries 1 in FIGS. 1 and 2 has a long plate-like shape extending in the axial direction, and the conductive plate 5 in the battery unit 10 in FIG. 3 has a plate-like shape extending in the two directions orthogonal to each other. In this way, it is preferable for the conductive plate 5 in the metal-air battery 1 to have a plate-like shape that extends at least in the axial direction.

Depending on the design of the metal-air battery 1, for example, both of the separator 41 and the positive electrode conductive layer 21 may be prepared as tubular independent members, and the separator 41 may be inserted inside the positive electrode conductive layer 21 having an outer side surface on which the positive electrode catalyst layer 22 and the positive electrode current collector 24 are formed. Alternatively, the separator 41 may be omitted in cases such as where the generation of dendrites does not cause any problem.

The configurations of the above-described preferred embodiments and variations may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

REFERENCE SIGNS LIST

1 Metal-air battery
2 Positive electrode
3 Negative electrode
4 Electrolyte layer
5 Conductive plate
21 Positive electrode conductive layer
22 Positive electrode catalyst layer
24 Positive electrode current collector
J1 Central axis

The invention claimed is:

1. A metal-air battery comprising:
a tubular positive electrode centered on a predetermined central axis;
a negative electrode opposing an inner side surface of said positive electrode; and
an electrolyte layer disposed between said negative electrode and said positive electrode,
wherein said positive electrode includes:
a tubular positive electrode conductive layer centered on said central axis;
a positive electrode catalyst layer formed on an outer side surface of said positive electrode conductive layer and having lower electrical conductivity than said positive electrode conductive layer; and
a positive electrode current collector formed on an area of said outer side surface of said positive electrode conductive layer where an axially-extending gap is formed in said positive electrode catalyst layer does not exist, to be in direct contact with said outer side surface along said gap, and
a thickness in a radial direction of said positive electrode current collector is greater than a thickness in the radial direction of said positive electrode catalyst layer.

2. The metal-air battery according to claim 1, wherein said positive electrode conductive layer is made of conductive ceramic, and
said positive electrode current collector is made of solder that is capable of forming a bond with ceramic.

3. The metal-air battery according to claim 1, wherein said positive electrode conductive layer, said positive electrode catalyst layer, and said positive electrode current collector are each made of a perovskite type oxide.

4. The metal-air battery according to claim 1, further comprising:
a conductive plate having a plate-like shape that extends at least in an axial direction along said central axis and having higher electrical conductivity than said positive electrode current collector,
wherein said positive electrode current collector extends in said axial direction on said outer side surface of said positive electrode conductive layer, and said conductive plate is bonded to approximately a whole in said axial direction of said positive electrode current collector.

5. The metal-air battery according to claim 4, wherein said conductive plate is bonded to a positive electrode current collector of another metal-air battery that has a structure similar to a structure of said metal-air battery.

6. A metal-air battery comprising:
a tubular positive electrode centered on a predetermined central axis;
a negative electrode opposing an inner side surface of said positive electrode; and
an electrolyte layer disposed between said negative electrode and said positive electrode,
wherein said positive electrode includes:
a tubular positive electrode conductive layer centered on said central axis;
a positive electrode catalyst layer formed on an outer side surface of said positive electrode conductive layer and having lower electrical conductivity than said positive electrode conductive layer; and
a positive electrode current collector formed on an area of said outer side surface of said positive electrode conductive layer where said positive electrode catalyst layer does not exist, to be in direct contact with said outer side surface, and
a thickness in a radial direction of said positive electrode current collector is greater than a thickness in the radial direction of said positive electrode catalyst layer,
wherein said positive electrode conductive layer is made of conductive ceramic, and
said positive electrode current collector is made of solder that is capable of forming a bond with ceramic, and
further comprising:
a conductive plate having a plate-like shape that extends at least in an axial direction along said central axis and having higher electrical conductivity than said positive electrode current collector,
wherein said positive electrode current collector extends in said axial direction on said outer side surface of said positive electrode conductive layer, and
said conductive plate is bonded to approximately a whole in said axial direction of said positive electrode current collector.

7. The metal-air battery according to claim 6, wherein said conductive plate is bonded to a positive electrode current collector of another metal-air battery that has a structure similar to a structure of said metal-air battery.

8. A metal-air battery comprising:
a tubular positive electrode centered on a predetermined central axis;
a negative electrode opposing an inner side surface of said positive electrode; and
an electrolyte layer disposed between said negative electrode and said positive electrode,
wherein said positive electrode includes:
a tubular positive electrode conductive layer centered on said central axis;
a positive electrode catalyst layer formed on an outer side surface of said positive electrode conductive layer and having lower electrical conductivity than said positive electrode conductive layer; and
a positive electrode current collector formed on an area of said outer side surface of said positive electrode conductive layer where said positive electrode catalyst layer does not exist, to be in direct contact with said outer side surface, and
a thickness in a radial direction of said positive electrode current collector is greater than a thickness in the radial direction of said positive electrode catalyst layer,
wherein positive electrode conductive layer, said positive electrode catalyst layer, and said positive electrode current collector are each made of a perovskite type oxide, and
further comprising:
a conductive plate having a plate-like shape that extends at least in an axial direction along said central axis and having higher electrical conductivity than said positive electrode current collector,
wherein said positive electrode current collector extends in said axial direction on said outer side surface of said positive electrode conductive layer, and
said conductive plate is bonded to approximately a whole in said axial direction of said positive electrode current collector.

9. The metal-air battery according to claim 8, wherein said conductive plate is bonded to a positive electrode current collector of another metal-air battery that has a structure similar to a structure of said metal-air battery.

10. The metal-air battery according to claim 6, wherein said positive electrode catalyst layer is a porous film.

11. The metal-air battery according to claim 7, wherein said positive electrode catalyst layer is a porous film.

12. The metal-air battery according to claim 8, wherein said positive electrode catalyst layers a porous film.

13. The metal-air battery according to claim 9, wherein said positive electrode catalyst layers a porous film.

14. A metal-air battery according to claim 1, wherein an axially-extending edge part of said positive electrode current collector is overlaid on an outer side surface of said positive electrode catalyst layer in a vicinity of an axially-extending edge of said positive electrode catalyst layer along said gap.

15. A metal-air battery according to claim 6, wherein an axially-extending edge part of said positive electrode current collector is overlaid on an outer side surface of said positive electrode catalyst layer in a vicinity of an axially-extending edge of said positive electrode catalyst layeralong said gap.

16. A metal-air battery according to claim 8, wherein an axially-extending edge part of said positive electrode current collector is overlaid on an outer side surface of said positive electrode catalyst layer in a vicinity of an axially-extending edge of said positive electrode catalyst layer along said gap.

* * * * *